(12) United States Patent
Huang et al.

(10) Patent No.: US 12,286,293 B2
(45) Date of Patent: Apr. 29, 2025

(54) RECYCLING BIN FOR CLASSIFICATION AND COMPRESSION OF RENEWABLE RESOURCES

(71) Applicant: ZHEJIANG LIANYUN ZHIHUI SCI-TECH CO., LTD., Zhejiang (CN)

(72) Inventors: Zheng Huang, Zhejiang (CN); Kexu Xu, Zhejiang (CN); Yufeng Wang, Zhejiang (CN)

(73) Assignee: ZHEJIANG LIANYUN ZHIHUI SCI-TECH CO., LTD., Zhejiang (CN)

( * ) Notice: Subject to any disclaimer, the term of this patent is extended or adjusted under 35 U.S.C. 154(b) by 177 days.

(21) Appl. No.: 18/016,867

(22) PCT Filed: Jun. 11, 2021

(86) PCT No.: PCT/CN2021/099758
§ 371 (c)(1),
(2) Date: Feb. 20, 2023

(87) PCT Pub. No.: WO2022/022111
PCT Pub. Date: Feb. 3, 2022

(65) Prior Publication Data
US 2023/0271776 A1    Aug. 31, 2023

(30) Foreign Application Priority Data
Jul. 27, 2020   (CN) .......................... 202021503883.5

(51) Int. Cl.
*B65F 1/14*     (2006.01)
*B65B 13/18*    (2006.01)
(Continued)

(52) U.S. Cl.
CPC .......... *B65F 1/1405* (2013.01); *B65B 13/185* (2013.01); *B65F 1/0053* (2013.01);
(Continued)

(58) Field of Classification Search
CPC . B65F 1/0053; B65F 1/1405; B65F 2210/162
See application file for complete search history.

(56) References Cited

U.S. PATENT DOCUMENTS

| 4,711,390 A | * | 12/1987 | Andrews | ............... B30B 9/3057 |
| | | | | 229/125 |
| 9,834,375 B2 | * | 12/2017 | Jenkins | .................. B65F 1/1426 |
| 2016/0272419 A1 | * | 9/2016 | Jenkins | ..................... B65F 1/10 |

FOREIGN PATENT DOCUMENTS

| CN | 101670928 | 3/2010 |
| CN | 207645113 | 7/2018 |

(Continued)

OTHER PUBLICATIONS

"International Search Report (Form PCT/ISA/210) of PCT/CN2021/099758", mailed on Aug. 23, 2021, with English translation thereof, pp. 1-5.

(Continued)

*Primary Examiner* — Andrew M Tecco
(74) *Attorney, Agent, or Firm* — JCIPRNET

(57) ABSTRACT

A recycling bin for classification and compression of renewable resources, comprising a recycling bin housing, and a recycling bin inner container and a pressurizing device provided inside the recycling bin housing, wherein a weighing device is further provided between a bottom of the recycling bin inner container and the recycling bin housing; the pressurizing device comprises a compression beam provided in an upper part of an inner cavity of the recycling bin inner container, and a driving part for driving the compression beam to move; an upper end of the driving part is connected to the compression beam, and a lower end is connected to the bottom of the recycling bin inner container.

15 Claims, 9 Drawing Sheets

(51) Int. Cl.
*B65F 1/00* (2006.01)
*B65F 1/08* (2006.01)

(52) U.S. Cl.
CPC .......... *B65F 1/08* (2013.01); *B65F 2210/138* (2013.01); *B65F 2210/1443* (2013.01); *B65F 2210/162* (2013.01); *B65F 2210/168* (2013.01); *B65F 2210/184* (2013.01); *B65F 2210/20* (2013.01)

(56) References Cited

FOREIGN PATENT DOCUMENTS

| | | | | |
|---|---|---|---|---|
| CN | 109335392 | | 2/2019 | |
| CN | 208932167 | | 6/2019 | |
| CN | 210236052 | | 4/2020 | |
| CN | 211055895 | | 7/2020 | |
| CN | 211055895 U | * | 7/2020 | ................ B65F 1/14 |
| CN | 111891590 | | 11/2020 | |
| KR | 102032942 | | 10/2019 | |

OTHER PUBLICATIONS

"Written Opinion of the International Searching Authority (Form PCT/ISA/237) of PCT/CN2021/099758", mailed on Aug. 23, 2021, pp. 1-6.

* cited by examiner

RECYCLING BIN FOR CLASSIFICATION AND COMPRESSION OF RENEWABLE RESOURCES

CROSS-REFERENCE TO RELATED APPLICATION

This application is a 371 of international application of PCT application serial no. PCT/CN2021/099758, filed on Jun. 11, 2021, which claims the priority benefit of China application no. 202021503883.5, filed on Jul. 27, 2020. The entirety of each of the above mentioned patent applications is hereby incorporated by reference herein and made a part of this specification.

TECHNICAL FIELD

The present disclosure relates to the field of garbage classification, more particularly to a recycling bin for classification and compression of renewable resources.

DESCRIPTION OF RELATED ART

A considerable part of the municipal solid waste is product out-packaging materials, such as cartons, paper boxes, metal cans, beverage bottles, plastic containers, composite Tetra Pak packages, etc. These materials are often disposable, light in weight, soft in texture and will occupy a large space when in storage. At present, the intelligent compression resource recycling bins available on the market have a small capacity, the bin bodies are often fully loaded, resulting in a high frequency of collection and transportation.

At present, the existing recycling bins with a compression function mainly apply an electric compression mode, for example, the technical solution of the Chinese patent with the publication number of CN101670928B and entitled Intelligent Electric Compression Waste Bin discloses a waste bin in which recyclables can be compressed, here the compression mode is an electric drive compression mode. However, the pressure of such a compression mode is limited, the compression effect is not good when many beverage bottles and cans are stored inside the waste bin, in addition, the energy consumption is high.

The solution of the Chinese utility model with the publication number of CN210236052U and entitled Recyclable Garbage Compressor for Garbage Classification discloses a recyclable garbage compressor which conducts compression employing a hydraulic mode. In such a solution, the hydraulic drive mode enables the garbage at the lower side of the recycling bin to get a great pressure, the volume is effectively compressed, meanwhile, the energy consumption remains at an economical level.

In the new generation of intelligent recycling bins developed by our company, a weighing device is provided at the bottom of the bin body, which can feed the feeding weight of the recyclables back to the user. In such a system, when a compression function is added, although the electric compression mode can ensure the weighing device not to be damaged, the compression is insufficient, and the compression effect is not good. In the solution with the publication number of CN210236052U, although the compression mode can compress the recyclables fully, the weighing device at the bottom of the bin body will suffer a great downward pressure and is easy to damage; therefore, how to efficiently complete compression of recyclables and meanwhile protect the weighing device at the bottom is a technical problem to be solved.

SUMMARY

Technical Problems

To efficiently complete compression of recyclables and meanwhile protect the weighing device at the bottom.

Technical Solutions

In order to achieve the above object, the present disclosure employs the following technical solutions.

A recycling bin for classification and compression of renewable resources, including a recycling bin housing, and a recycling bin inner container and a pressurizing device provided inside the recycling bin housing, wherein a weighing device is further provided between a bottom of the inner container and the recycling bin housing; the pressurizing device includes a compression beam provided in an upper part of an inner cavity of the inner container, and a driving part for driving the compression beam to move; an upper end of the driving part is connected to the compression beam, and a lower end is connected to the bottom of the inner container.

Preferably, the driving part is provided outside of the cavity of the inner container, a strip-shape through hole is provided on a side wall of the inner container, the compression beam extends out of the strip-shape through hole to connect to the driving part.

Preferably, a protection bar is further provided outside of the driving part.

Preferably, the compression beam includes a support structure and a plurality of pressurizing bars connected to a lower side of the support structure.

Preferably, a bin capacity detection device is further fixedly provided in the middle of a top of the inner container.

Preferably, a packing mechanism is further provided inside of the inner container, the packing mechanism includes a packing strap storage tray, the packing strap storage tray is provided on a rear side wall of the inner container, the packing strap storage tray is provided with a packing strap outlet, the rear side wall of the inner container extends downward to a bottom plate of the inner container, and a packing strap placement slot is provided extending from an inside of the bottom plate to an outside of the bottom plate.

Preferably, the packing strap placement slot is provided with a plurality of limit bars, preventing the packing strap slipping from inside the packing strap placement slot.

Preferably, a lifting mechanism is further provided inside the cavity body of the inner container, the lifting mechanism includes a lifting plate and a lifting chain, a front side of the lifting plate is hinged to a front side edge of the bottom plate of the inner container, a rear side is connected to the lifting chain, and the other end of the lifting chain can be connected to the compression beam.

Preferably, a chain slot capable of accommodating the lifting chain is provided on an inner side wall of the inner container, and a top end of the chain slot is provided with an idle-time chain fixing device.

Preferably, the lifting chain is connected to the compression beam through an elastic hook.

Preferably, the bin body of the recycling bin is further provided with a feeding door assembly, the bin body is provided with a feeding port, the feeding door assembly is provided on the feeding port and is used for controlling the opening and closing of the feeding port; the bin body at the edge of the feeding port is further provided with a safety light curtain which is used for detecting whether there is an obstacle inside the feeding port, the safety light curtain generates a signal to abort the closing action of the feeding door assembly when detecting an obstacle; the feeding door assembly includes a feeding door, a driving motor and a driving rope connected to the feeding door and the driving motor, the driving rope is connected to the feeding door, the rope is retracted or released through the forward or reverse rotation of the driving motor to drive the up and down movement of the feeding door and thus to realize the opening and closing of the feeding port.

Preferably, the bin body at a lower part of the feeding port is vertically provided with a slide rail, the feeding door is provided with a slide block, the slide block is connected onto the slide rail in a sliding manner, a bottom end of the slide rail is provided with a guide wheel, the driving rope is connected onto the slide block and is connected to the driving motor by passing round the guide wheel to form a ring shape, the driving motor retracts and releases the driving rope through forward rotation or reverse rotation to drive the slide block connected onto the ring shaped driving rope to slide up and down along the slide rail, thereby realizing the opening and closing of the feeding door.

Preferably, two sides of the feeding door are provided with a lifting auxiliary guide rail for sliding positioning, the lifting auxiliary guide rail is parallel to the slide rail, the feeding door is transversely provided with an auxiliary guide rail connection plate, the feeding door is connected to the lifting auxiliary guide rail through the auxiliary guide rail connection plate, and the feeding door can move up and down along the lifting auxiliary guide rail.

Preferably, an upper end of the feeding door is provided with a guide part, and the guide part, when contacting an obstacle, can partially decompose the reacting force of the obstacle to a moveable door body into a horizontal force.

Preferably, the guide part is hinged to the upper end of the feeding door through an elastic hinge, the guide part turns inward when suffering an external force, and the guide part is reset through the elastic hinge after the external force disappears.

Preferably, the upper end of the feeding door when closed is provided with a high-position travel switch, so that the feeding door stops moving upward when reaching the closed position; the lower end of the feeding door when opened is provided with a low-position travel switch, so that the feeding door stops moving downward when reaching the maximum-opening position.

Preferably, the bin body includes a door body and a frame body, one side of the door body is hinged to the frame body and the other side can be locked with the frame body, the feeding port is provided on an upper part of the door body, and the feeding door assembly is provided on the door body.

Preferably, one side of the inner container is provided with an opening, and the position of the opening corresponds to the position of the feeding port.

Preferably, the inner container includes an inner container frame and an inner container door, one side of the inner container door is hinged to the inner container frame and the other side can be locked with the inner container frame, and the opening is provided on the inner container door.

Beneficial Effects

In the recycling bin for classification and compression of renewable resources disclosed in the above technical solution, the arrangement of the hydraulic device enables the recyclables to be efficiently compressed, meanwhile not causing a pressure to the bottom plate, protecting the weighing part arranged at the bottom and ensuring the function of the weighing part. In this solution, through the arrangement of the lifting mechanism, the compacted recyclables are easier to clean and transport. Meanwhile, the arrangement of the packing mechanism enables the compressed recyclables to be conveniently packed, further providing convenience for the cleaning and transportation after compression. In this solution, a recyclable content detection device is further provided, which enables an early warning when the recyclables inside the recycling bin reach a certain height, then the feeding port is closed, and a prompt to clean and transport is given.

In this solution, the drive mode for the feeding door assembly is designed as a mode of motor driving and rope pulling, which reduces the noise caused by the existing drive mode for the feeding door of up down opening, lowers the manufacturing cost of the feeding door, improves the response speed of opening and closing of the feeding door, and increases the service efficiency of the feeding door assembly.

The recycling bin for classification and compression of renewable resources is inbuilt with an inductive pinch prevention function and a mechanical pinch prevention function, increasing the safety of usage. Specifically, in normal conditions, the inductive pinch prevention function works; during the normal closing process of the bin door assembly, if the safety light curtain detects an obstacle (for example, the finger of an operator), it generates a signal, and the closing action of the bin door assembly is aborted, even the bin door assembly may open in reverse; therefore, the occurrence of hand pinching is prevented. When the inductive pinch prevention function fails, that is to say, the safety light curtain cannot detect an obstacle, during the normal closing process of the bin door assembly, the moveable door body will contact the obstacle first, under the reacting force of the obstacle, the moveable door body can turn inward along the hinge end, thereby forming a gap below the bin door main body to avoid the occurrence of hand pinching.

In addition, existing recycling bins generally have the feeding port arranged on the bin body and the door body arranged below the feeding port. In such solutions, the inner container has to be arranged lower in height than the bottom position of the feeding port and is arranged to be aligned to the height of the door body to be conveniently taken out. In the solution of the present disclosure, the feeding port is arranged on the door body, the door body covers a whole side of the bin body, and the whole side can be opened when the door body is opened. Correspondingly, the inner container is provided with an opening at a position corresponding to the feeding port on the door body, ensuring the recyclables to enter the inner container. When the recyclables are to be taken out, open both the door body and the inner container door to take out the recyclables inside the inner container. Such an arrangement mode greatly increases the storage capacity of the recycling bin having the same volume and increases the storage height of the recyclables.

DESCRIPTION OF THE EMBODIMENTS

Figure 1:
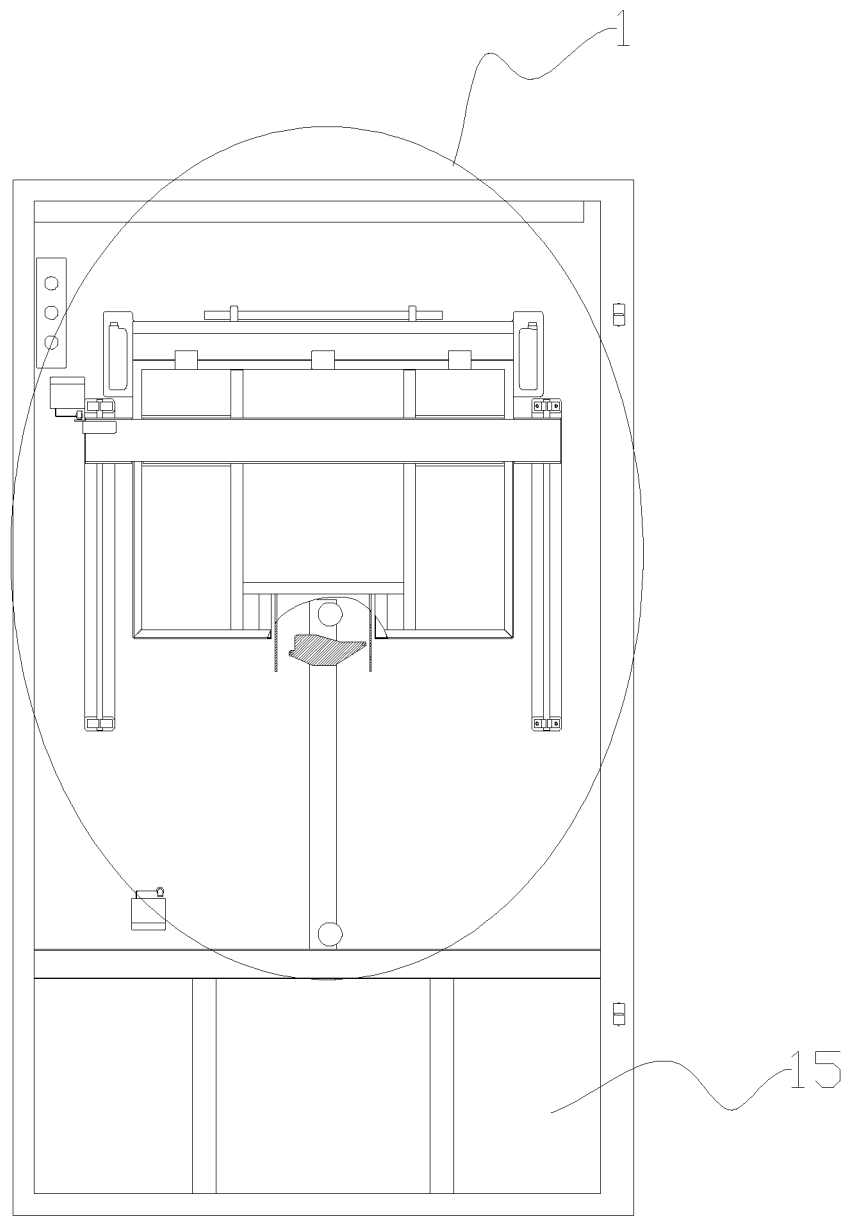
FIG. 1 is a structure diagram of a back side of a door body according to an embodiment of the present disclosure.
Figure 2:
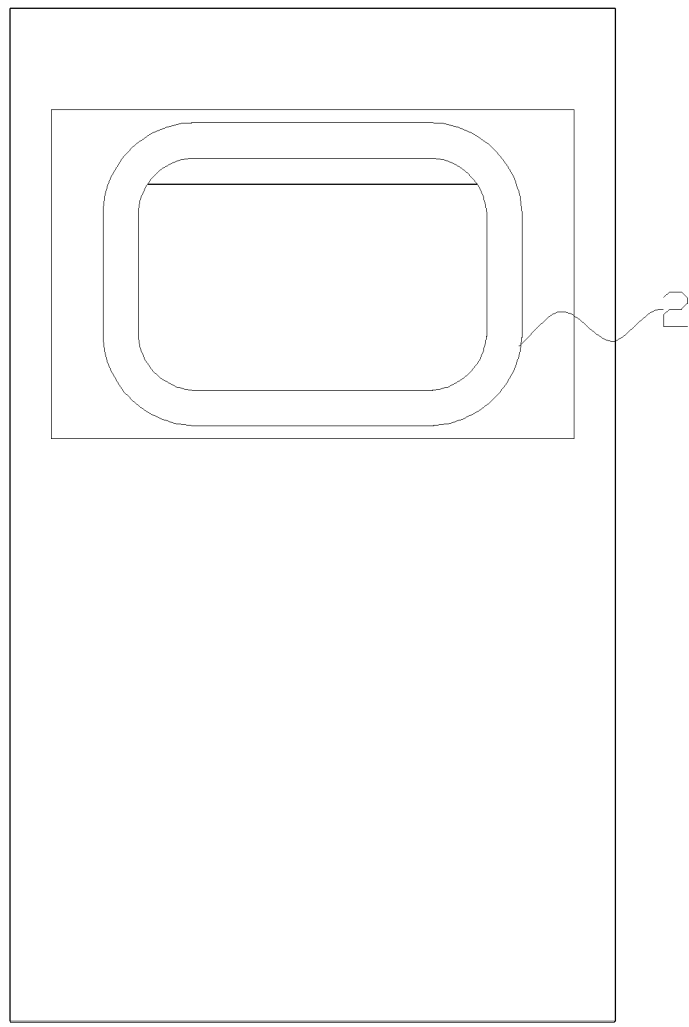
FIG. 2 is a structure diagram of a front side of a door body according to an embodiment of the present disclosure.
Figure 3:
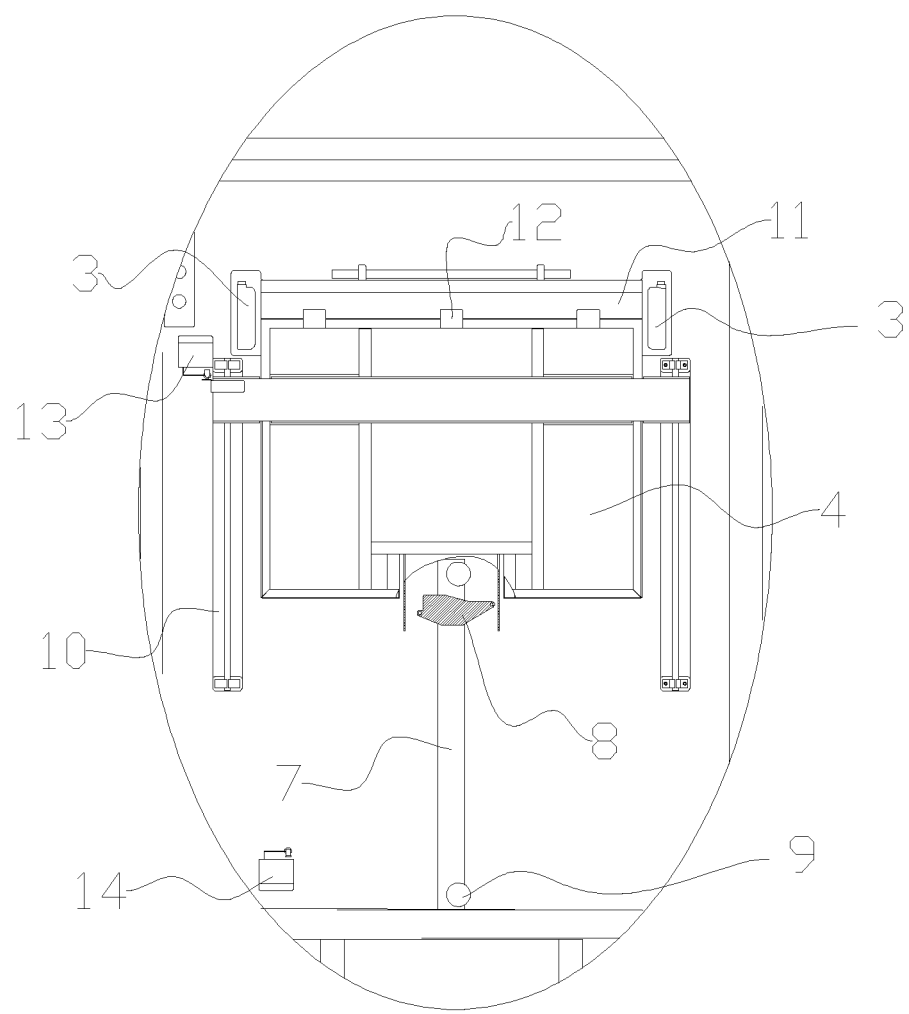
FIG. 3 is a detailed structure diagram of Part 1 in FIG. 1.
Figure 4:
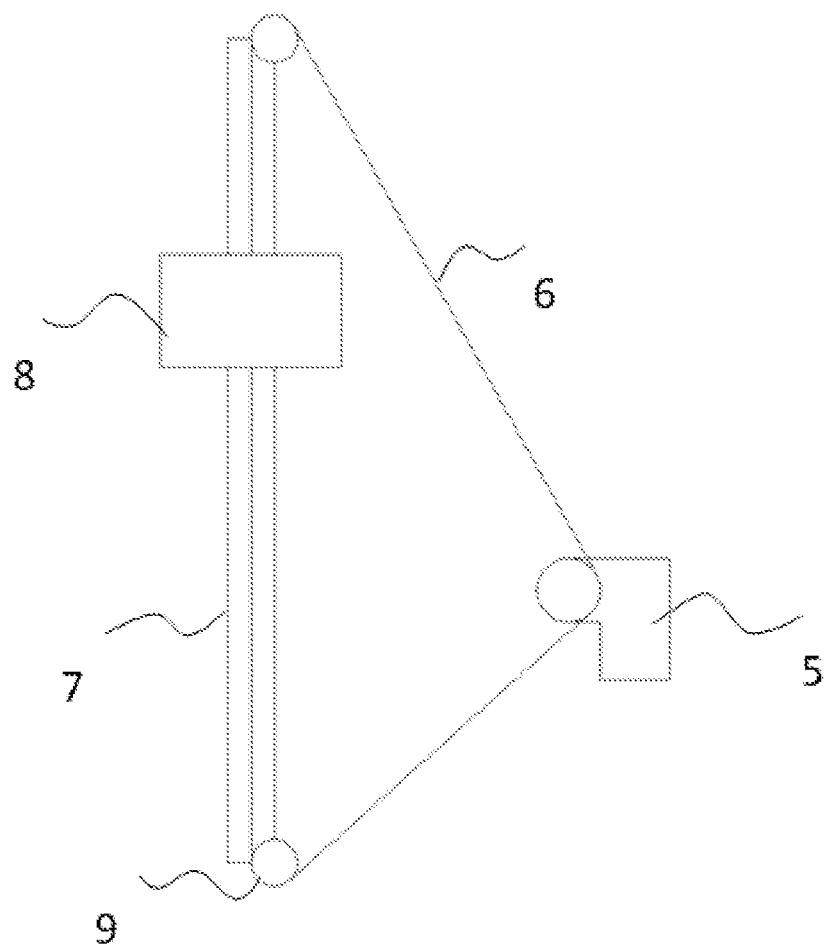
FIG. 4 is a diagram of a driving motor and a driving rope in a feeding door assembly according to an embodiment of the present disclosure.
Figure 5:
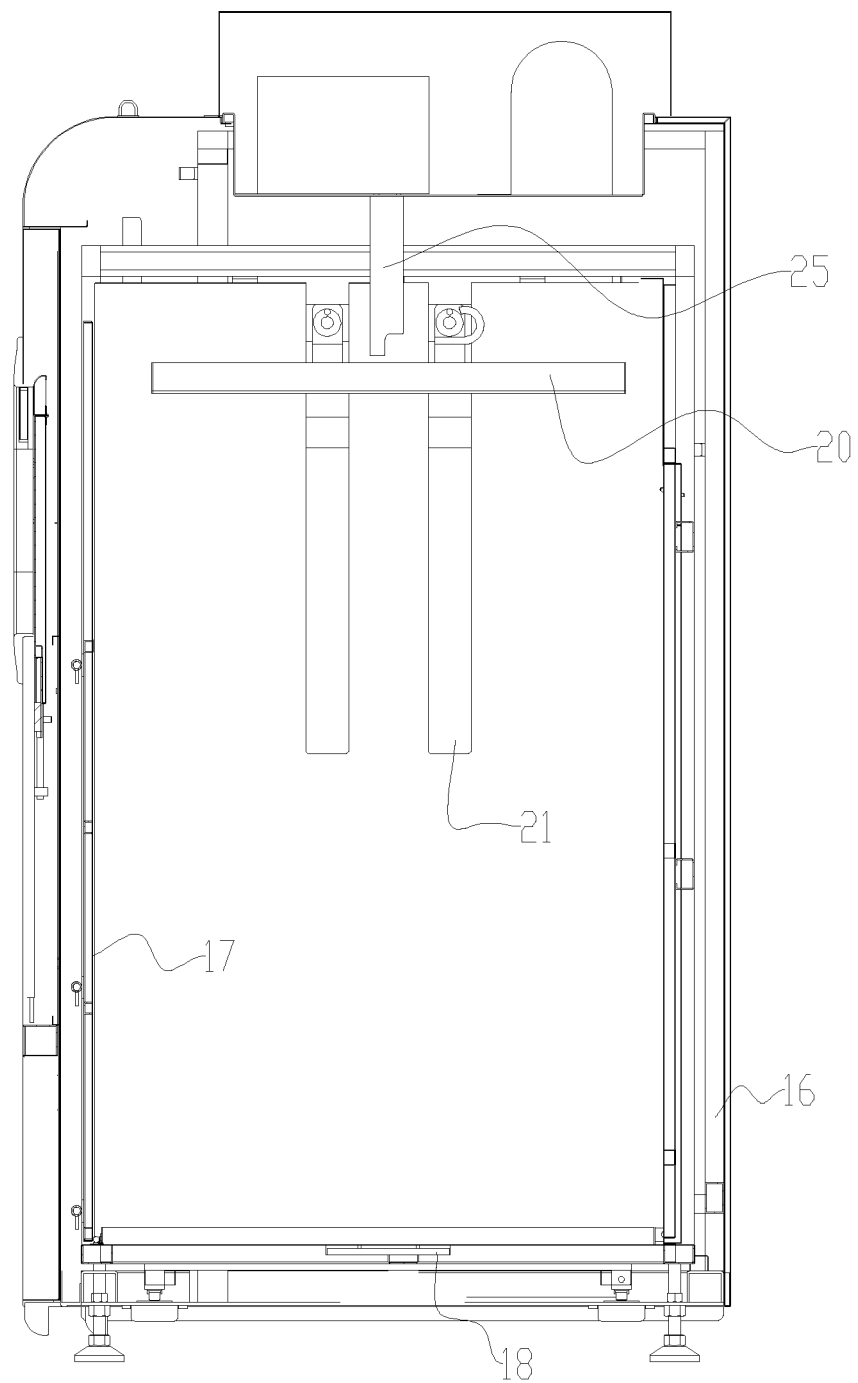
FIG. 5 is a sectional structure diagram of a bin body according to an embodiment of the present disclosure.

The embodiments of the present disclosure are described below in detail, examples of which are shown in the accompanying drawings on which the same or similar designators are used for representing the same or similar elements or elements having the same or similar functions. The following embodiments described in combination with the drawings are exemplary and intended to explain the present disclosure, but they should not be construed as a limitation on the present disclosure.

In the description of the present disclosure, it is to be understood that the orientation or position relations indicated by such terms as "center", "longitudinal", "transversal", "length", "width", "thickness", "upper", "lower", "front", "rear", "left", "right", "vertical", "horizontal", "top", "bottom", "inside", "clockwise", "anticlockwise" are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

In addition, terms "first", "second" are merely for the purpose of description, but should not be understood as the indication or implication of relative importance or as the implicit indication of the quantity of the designated technical features. Therefore, features defined by "first" and "second" may specifically or implicitly include one or more such features. In the description of the present disclosure, unless otherwise stated, "a plurality of" means two or more than two.

In the description of the present disclosure, unless otherwise specifically stated and defined, terms such as "mounting", "interconnection", "connection", "fixing", etc. should be interpreted expansively. For example, they may be fixed connection, also may be detachable connection, or integrated connection; may be mechanical connection, also may be electrical connection; may be direct connection, also may be indirect connection through an intermediate, and may be internal communication between two elements. The ordinary skill in this field can understand the specific implication of the above terms in the present disclosure in accordance with specific conditions.

In the present disclosure, unless otherwise specified and limited, the phrase that the first feature is on or under the second feature may be that the first feature and the second feature are in direct contact, or the first feature and the second feature are indirect contact through an intermediate medium. In addition, the phrase that the first feature is above, over or on the second feature may be that the first feature is directly above or diagonally above the second feature, or merely indicates that the first feature has a higher horizontal height than the second feature. The phrase that the first feature is below, under or underneath the second feature may be that the first feature is directly below or diagonally below the second feature, or merely indicates that the first feature has a smaller horizontal height than the second feature.

The present embodiment relates to a recycling bin for classification and compression of renewable resources. The recycling bin for classification and compression of renewable resources includes a bin body and an inner container 17 provided inside the bin body. The bin body includes a door body 15 and a frame body 16, one side of the door body 15 is hinged to the frame body 16, and the other side can be locked with the frame body 16. The integrated door body 15 has a different arrangement mode from the existing door body 15 structure in which a feeding port 2 and the door body 15 are arranged separately. In existing technical solutions, the door body can be opened from a lower side of the feeding port only, consequently the inner container for accommodating recyclables must be set in height to be lower than a lower edge of the feeding port, so that it can be taken out to dump the garbage. In this solution, the integrated door body enables the space above the lower edge of the feeding port to be effectively utilized; when the door body is opened as a whole, the contents in the above space can also be conveniently cleaned. The arrangement of the integrated door body effectively improves the storage space of the recycling bin.

Feeding Door Assembly

As shown in FIG. 1 to FIG. 4, the bin body is provided with an automatic feeding door assembly 1 which can be opened and closed up and down, the bin body is provided with a feeding port 2, the feeding door assembly 1 is provided on the feeding port 2 and is used for controlling the opening and closing of the feeding port 2; the bin body at the edge of the feeding port 2 is further provided with a safety light curtain 3 which is used for detecting whether there is an obstacle inside the feeding port 2, the safety light curtain 3 generates a signal to abort the closing action of the feeding door assembly 1 when detecting an obstacle; here, the safety light curtain 3 is similar to a sensor in function, and when sensing there is a foreign matter in the feeding port 2, it sends a shutdown signal to a driving motor 5 described hereinafter. The feeding door assembly 1 includes a feeding door 4, a driving motor 5 and a driving rope 6 connected to the feeding door 4 and the driving motor 5, the driving rope 6 is connected to the feeding door 4, the rope is retracted or released through the forward or reverse rotation of the driving motor 5 to drive the up and down movement of the feeding door 4 and thus to realize the opening and closing of the feeding port 2. The bin body at a lower part of the feeding port 2 is vertically provided with a slide rail 7, the feeding door 4 is provided with a slide block 8, the slide block 8 is connected onto the slide rail 7 in a sliding manner, a bottom end of the slide rail 7 is provided with a guide wheel 9, the driving rope 6 is connected onto the slide block 8 and is connected to the driving motor 5 by passing round the guide wheel 9 to form a ring shape, the driving motor 5 retracts and releases the driving rope 6 through forward rotation or reverse rotation to drive the slide block 8 connected onto the ring shaped driving rope 6 to slide up and down along the slide rail 7, thereby realizing the opening and closing of the feeding door 4. Two sides of the feeding door 4 are provided with a lifting auxiliary guide rail 10 for sliding positioning, the lifting auxiliary guide rail 10 is parallel to the slide rail 7, the feeding door 4 is transversely provided with an auxiliary guide rail 10 connection plate, the feeding door 4 is connected to the lifting auxiliary guide rail 10 through the auxiliary guide rail 10 connection plate, and the feeding door 4 can move up and down along the lifting auxiliary guide rail 10. An upper end of the feeding door 4 is provided with a guide part 11, and the guide part 11, when contacting an obstacle, can partially decompose the reacting force of the obstacle to the moveable door body 15 into a horizontal force. Besides the pinch prevention function of the safety light curtain 3, the feeding door 4 is further provided with a physical pinch prevention member which can be started in an emergency when the safety light curtain 3 fails. The guide part 11 is hinged to the upper end of the feeding door 4 through an elastic hinge 12, the guide part 11 turns inward when suffering an external force, and the guide part 11 is reset through the elastic hinge 12 after the external force disappears. The upper end of the feeding door 4 when closed is provided with a high-position travel switch 13, so that the feeding door 4 stops moving upward when reaching the closed position; the lower end of the feeding door 4 when opened is provided with a low-position travel switch 14, so that the feeding door 4 stops moving downward when reaching the maximum-opening position. The feeding port 2 is provided on an upper part of the door body 15, and the feeding door assembly 1 is provided on the door body 15.

Existing feeding doors mainly have two opening modes, including vertically opening from bottom to top and fan-shaped opening from bottom to top. The mode of vertically opening from bottom to top mainly employs the rack and pinion drive mode, for example, the drawings disclosed in the patent technical solution with the publication number of CN210417870U and entitled Intelligent Renewable Resource Recycling Bin show that the opening mode from bottom to top is driven by sun gear and rack. In the solution of this application, the drive mode for the feeding door assembly is optimized, a driving motor is utilized in combination with a driving rope, and the door body is pulled by the rope, which avoids the noise caused by the rack and pinion drive mode and saves the manufacturing cost. Meanwhile, with the rack and pinion drive mode, the opening and closing speed of the feeding port is relatively slow, while the pull rope drive mode can speed up the opening and closing of the feeding port.

The arrangement of the slide rail makes the sliding trace of the feeding door fixed, so that the movement route of the feeding door is basically fixed. A line connected between the connection position of the driving rope and the feeding door and the position of the guide wheel is parallel to the arrangement direction of the slide rail, so that the drive direction of the driving rope is aligned to the movement direction guided by the slide rail. The arrangement of the auxiliary guide rail further fixes the lifting position of the feeding door, making the lifting of the feeding door more stable. Besides the pinch prevention function of the safety light curtain, the feeding door is further provided with a physical pinch prevention member which can be started in an emergency when the safety light curtain fails. The guide part can turn inward when there is a foreign matter stuck at the top of the feeding door, leaving certain movement space for the foreign matter and preventing delicate tissues such as hands being pinched. The guide part which is connected through an elastic hinge will turn inward when suffering an external force and will be reset when suffering no force, ensuring the tightness of the feeding door and preventing the inflow of rain, etc. The arrangement of the up and down travel switches enables the movement distance of the feeding door to be controlled, realizing the normal opening and closing of the feeding door. Different from the existing arrangement mode in which only the door body at the lower side of the feeding port can be opened, the door body covers a whole side of the bin body, and the door body can be opened as a whole so that the inner container is totally exposed.

The above embodiments relate to intelligent compression resource recycling bins. In this solution, the drive mode for the feeding door assembly is designed as a mode of motor driving and rope pulling, which reduces the noise caused by the existing drive mode for the feeding door of up down opening, lowers the manufacturing cost of the feeding door, improves the response speed of opening and closing of the feeding door, and increases the service efficiency of the feeding door assembly.

The recycling bin for classification and compression of renewable resources is inbuilt with an inductive pinch prevention function and a mechanical pinch prevention function, increasing the safety of usage. Specifically, in normal conditions, the inductive pinch prevention function works; during the normal closing process of the bin door assembly, if the safety light curtain detects an obstacle (for example, the finger of an operator), it generates a signal, and the closing action of the bin door assembly is aborted, even the bin door assembly may open in reverse; therefore, the occurrence of hand pinching is prevented. When the inductive pinch prevention function fails, that is to say, the safety light curtain cannot detect an obstacle, during the normal closing process of the bin door assembly, the moveable door body will contact the obstacle first, under the reacting force of the obstacle, the moveable door body can turn inward along the hinge end, thereby forming a gap below the bin door main body to avoid the occurrence of hand pinching.

Inner Container Compression Assembly

As shown in FIG. 5 to FIG. 8, one side of the inner container is provided with an opening, and the position of the opening corresponds to the position of the feeding port 2. The inner container 17 includes an inner container frame and an inner container door, one side of the inner container door is hinged to the inner container frame and the other side can be locked with the inner container frame, and the opening is provided on the inner container door. A weighing device 18 is further provided between a bottom of the inner container 17 and the recycling bin body; the inner container 17 is further provided with a pressurizing device; the pressurizing device includes a driving part 19 provided on a side surface of the inner container 17 and a compression beam 20 provided in an upper part of the inner container 17; an upper end of the driving part 19 is connected to the compression beam 20, and a lower end is connected to the bottom of the inner container 17. The driving part 19 is provided outside of the cavity of the inner container 17, a strip-shape through hole 21 is provided on a side wall of the inner container 17, the compression beam 20 extends out of the strip-shape through hole 21 to connect to the driving part 19. A protection bar 22 is further provided outside of the driving part 19. The compression beam 20 includes a support structure 23 and a plurality of pressurizing bars 24 connected to a lower side of the support structure 23. A bin capacity detection device 25 is further fixedly provided in the middle of a top of the inner container 17. The inner container 17 compression assembly is provided with three control buttons of up, down and stop; through the three control buttons, the compression beam 20 may be controlled to stop at any position. The compression beam 20 may also be triggered through the capacity detection device 25 to automatically move; during the automatic movement process, if the button is manually pressed, the manual button instruction is prioritized.

The above driving part 19 may be a hydraulic drive cylinder as shown in the figure, also may be a screw stem or chain driven by a driving motor.

In the solution of this application, the inner container of the bin body is made of rigid materials of high strength, and the bottom plate will not deform when stressed. The compression device of the recycling bin employs a hydraulic device, so that the compression force is greater, the compression effect is better, and the energy consumption is more economical. One end of the hydraulic device is connected to the compression beam in the upper part of the inner container, and the other end is connected to the bottom of the inner container; during the compression process, both ends apply force simultaneously, so that the compression beam presses down the recyclables under the driving force of hydraulic device, the bottom plate which suffers an upward compression force avoids applying a direct compression force to the lower weighing part, and the weighing device is effectively protected. During practical settings, the magnitude of the forces applied to the two ends by the hydraulic device may be adjusted. The hydraulic drive device which is provided outside of the inner container does not occupy the space of the inner container while performing effective driving, ensures the volume of the inner container and the regularity of shape of the inner wall, so that the recycling bin can accommodate recyclables as many as possible and the recyclables can be smoothly taken out after the recycling bin is full. Since the driving part generally is of a long bar shape and is vertically provided outside of the inner container and mainly moves up and down, the pressure resistance performance in the upper and lower areas is relatively strong, however, it is easy to bend when stressed on the lateral side; furthermore, the housing material is relatively light and thin, which cannot effectively protect the important driving part; therefore, a protection bar is provided outside of the driving part, to ensure the stable operation of the driving part. Among the recyclables there are often beverage bottles, unfolded paper boxes and other recyclables containing a large amount of air, the arrangement of the pressurizing bars can make the air discharged greatly and thus more effectively compress the recyclables. The arrangement of the content detection device enables an early warning when the recyclables inside the recycling bin reach a certain height, then the feeding port is closed, and a prompt to clean and transport is given.

Recyclable Packing Assembly

Figure 6:
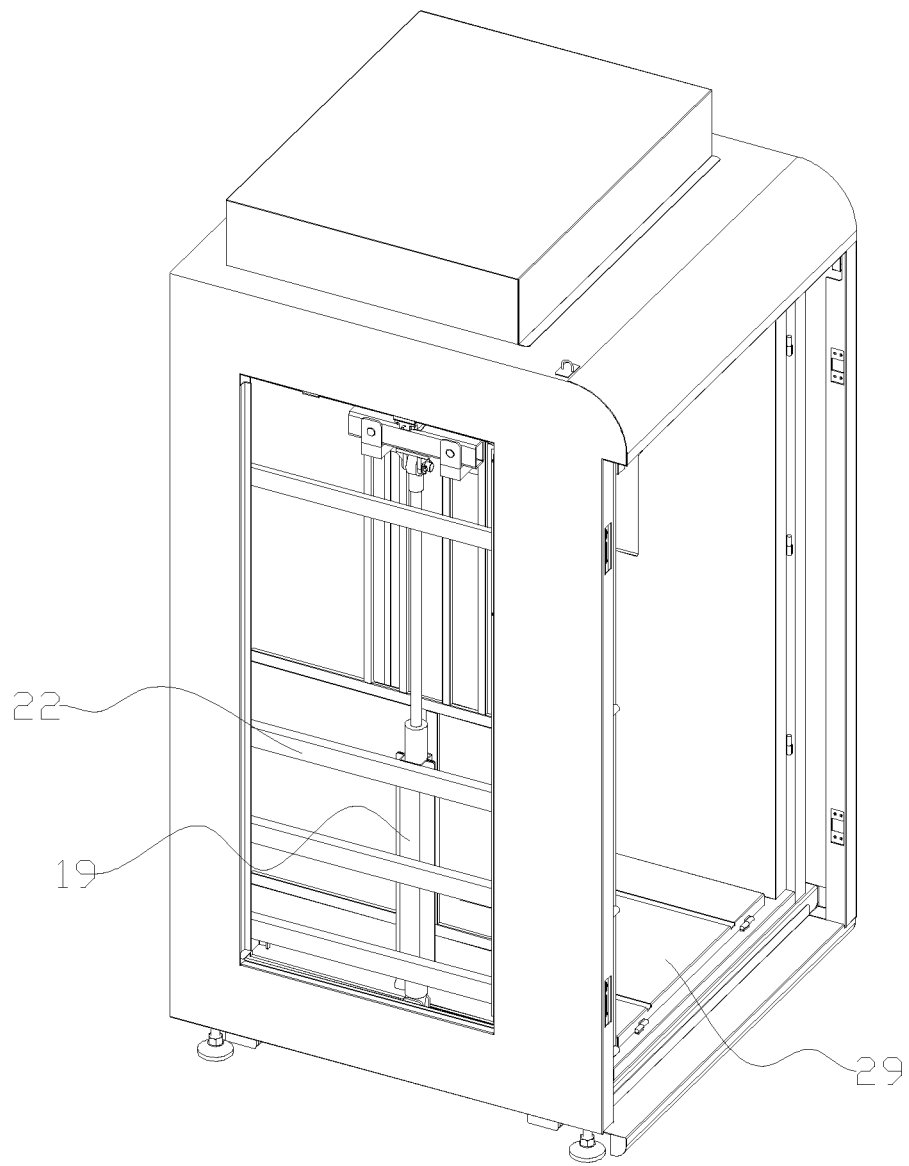
FIG. 6 is a side structure diagram of an inner container according to an embodiment of the present disclosure.
Figure 7:
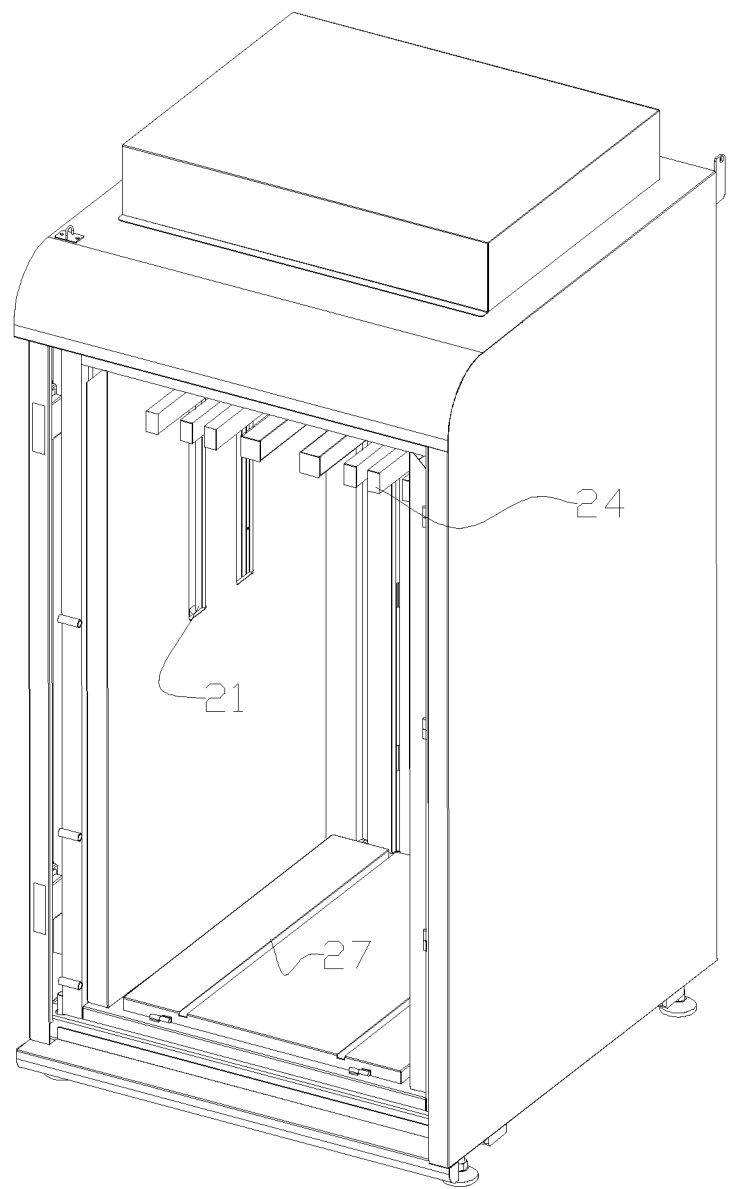
FIG. 7 is a sideview structure diagram when a door body of the bin body is opened according to an embodiment of the present disclosure.
Figure 8:
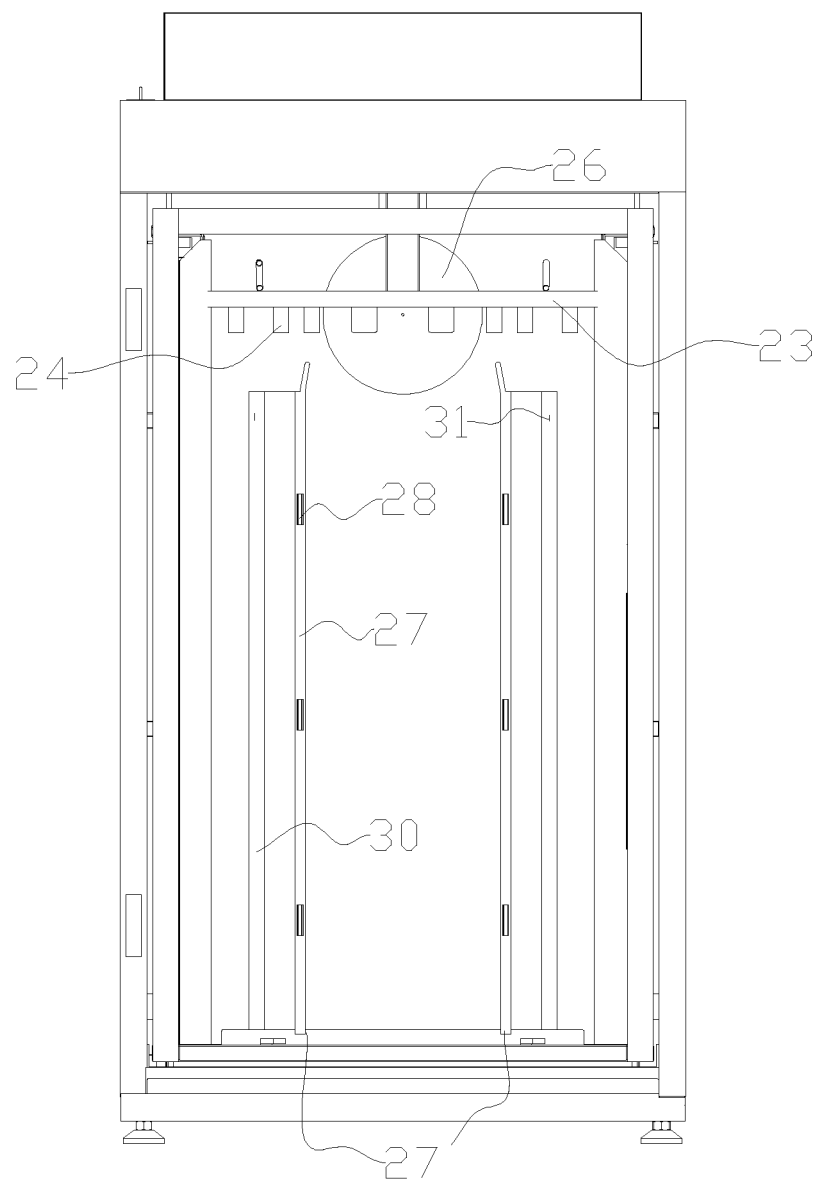
FIG. 8 is a front-view structure diagram when a door body of the bin body is opened according to an embodiment of the present disclosure.

As shown in FIG. 6 to FIG. 8, a packing mechanism is further provided inside of the inner container 17, the packing mechanism includes a packing strap storage tray 26, the packing strap storage tray 26 is provided on a rear side wall of the inner container 17, the packing strap storage tray 26 is provided with a packing strap outlet, the rear side wall of the inner container 17 extends downward to a bottom plate of the inner container 17, and a packing strap placement slot 27 is provided extending from an inside of the bottom plate to an outside of the bottom plate. The packing strap placement slot 27 is provided with a plurality of limit bars 28, preventing the packing strap slipping from inside the packing strap placement slot 27.

Before the recyclables are cleaned and transported, this technical solution presets a packing function. A coiled packing strap is placed in the packing strap storage tray. Before the recycling bin is used, the working staff first extracts the packing strap from the storage tray and pulls down to the outside of the bottom plate of the inner container along the packing strap placement slot. When the recyclables inside the recycling bin are compressed to be cleaned and transported, the packing strap may be extracted from the placement slot at the bottom plate to conveniently pack the compressed recyclables. Since the packing strap placement slot is arranged to be very long, the packing strap is easy to bend to cause a disorder when the recyclables are stacked together; therefore, limit bars are provided at multiple position points so that the packing strap can be fixed in position of placement and will not slip from the placement slot to cause a disorder.

The recyclable packing assembly provides convenience for the cleaning and transportation after compression, enabling the compressed recyclables to be conveniently packed, and further facilitating cleaning and transportation.

Recyclable Lifting Mechanism

As shown in FIG. 6 to FIG. 8, a lifting mechanism is further provided inside the cavity body of the inner container 17, the lifting mechanism includes a lifting plate 29 and a lifting chain, a front side of the lifting plate 29 is hinged to a front side edge of the bottom plate of the inner container 17, a rear side is connected to the lifting chain; in one implementable solution, the inner container 17 is further provided with a lifting power part, and the lifting power part raises or lowers the lifting plate 29 by pulling the lifting chain. In another implementation solution, the other end of the lifting chain can be connected to the compression beam 20, specifically, the lifting chain is detachably connected to the compression beam 20 through an elastic hook. In this solution, a chain slot 30 capable of accommodating the lifting chain is provided on an inner side wall of the inner container 17, and a top end of the chain slot 30 is provided with an idle-time chain fixing device 31. The end part of the lifting chain is connected onto the compression beam 20 only when the lifting plate 29 needs to be lift, and when the lifting function is not in use, the end part of the lifting chain is connected to the idle-time chain fixing device 31, and the lifting chain is hidden inside the chain slot 30 on the inner side wall of the inner container 17. The chain will not be pulled when the compression device is compressing the recyclables.

In the above recycling bin for classification and compression of renewable resources, recyclables are compressed through the compression device; during the compression process, the recyclables may be pressed against the side wall of the inner container, so that the packed recyclables are difficult to take out. In this solution, the recyclables are lifted obliquely through the lifting plate and the lifting chain, so that the pressure between the compressed recyclables and the side wall of the inner container is released during the lifting process; and by means of the slope, the recyclables get a downward sliding force and are easy to take out. Further, during the compression process, if the chain cannot be well fixed, it is easy to be brought in the recyclables by the compression beam to cause a disorder. The arrangement of the chain slot enables the chain not to be projected from the side wall of the inner container at an idle time, which avoids the influence on the compression function. The lifting chain raises the lifting plate through the lifting force caused by the upward movement of the compression beam; the connection manner through an elastic hook avoids the rigid stretch caused by the chain length, and thus protects the lifting chain and prolongs the service life. Through the arrangement of the recyclable lifting mechanism, the compacted recyclables are easier to clean and transport.

Recycling Bin Hardware System

Figure 9:
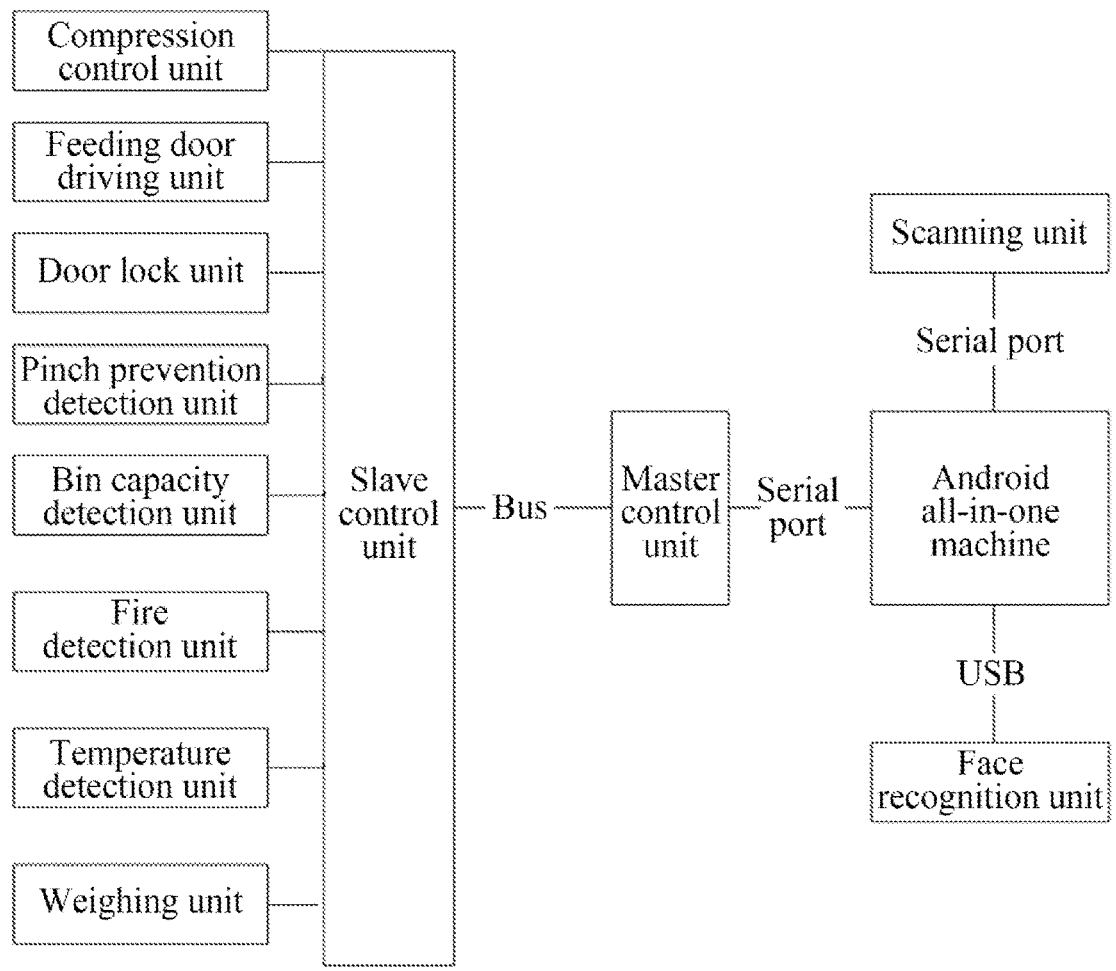
FIG. 9 is a structure diagram of a hardware system according to an embodiment of the present disclosure.
Figure 10:
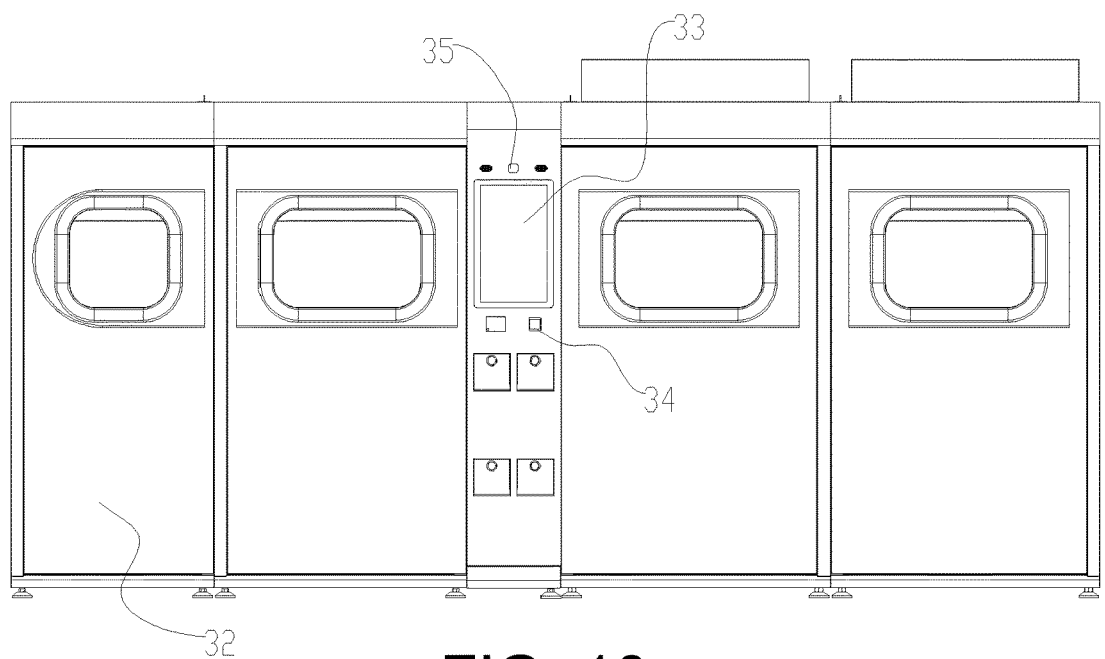
FIG. 10 is a device diagram of a hardware system according to an embodiment of the present disclosure.

As shown in FIG. 9 and FIG. 10, an extendable single bin body 32 is provided with eight functional units, and the functional units are integrally controlled through a slave control unit arranged on the single bin body; all the functional units arranged on the single bin body and the slave control unit each have a separate electric control system, and the functional units are communicated with and connected to an arranged master control unit through a bus connected to the slave control unit. The master control unit is connected to an Android all-in-one machine 33 through a serial port, and the Android all-in-one machine 33 is connected to a code scanning unit 34 involving signal input and a face recognition unit 35.

The present disclosure adopts the bus technology, has strong anti-interference, improves the stability of the product, facilitates the expansion of number of the bin bodies, supports 1 to 8 bin bodies, and can adapt to the needs of different users. Since all functional units arranged on the single bin body and the slave control unit are equipped with a separate electric control system, there is no need to extend wires from the master control system to supply power, reducing the number of wire connections between components, reducing heat generation and internal wiring disorder. At the same time, the independence of the slave control unit also makes each function not interfere with each other, it can operate independently, and is easy to troubleshoot when a fault occurs.

When the recycling bin for classification and compression of renewable resources in the embodiments is being used, a user triggers the opening of the feeding door and feeds recyclables directly into the inner container of the recycling bin through the feeding port and the opening provided on the inner container. After the feeding action, the bottom weighing device measures the add weight of this feeding and feeds it back to the user. The inside content detection device detects the volume of the recyclables inside the inner container, when the recyclables reach a certain height, the compression beam is started to press down the recyclables. The pressurizing bars arranged below the compression beam can apply a pressure locally to objects such as bottles containing air, so that the air is discharged and the objects are better compressed. After the compression, if content height is still high, an early warning is given to prompt cleaning and transportation. The height value may be set differently according to needs. When cleaning and transportation are needed, the working staff opens the whole door of the bin body and meanwhile opens inner container door, so that the whole cavity of the inner container is exposed to facilitate operation. Then, the working staff extracts the head end of the packing strap running through the bottom plate and lets the strap pass round the top end of the compressed recyclables to pack. In the present embodiment, two sets of left and right packing assemblies are provided, which can more firmly bundle up the compressed recyclables. After the bundling and packing is completed, the working staff may take the lifting chain off the idle-time hook, control the compression beam to move down to a certain position through a control button, and hang the lifting chain onto the hook arranged on the compression beam. Then the compression beam is controlled to move up through a button to raise the lifting plate. In the present embodiment, lifting chains are provided at both left and right sides, ensuring the lifting plate to be raised more balanced. When the lifting plate is raised to a certain angle, the compression beam is stopped moving up. By the time, since two sides of the packed recyclables get a displacement, the tight pressure formed with the side wall during the compression process is released, meanwhile the recyclables get a downward force on the slope formed by the lifting plate, so that the packed recyclables can be conveniently taken out from the inner container door and the door body to complete cleaning and transportation.

In the recycling bin for classification and compression of renewable resources in the present embodiment, the feeding door has a high operation efficiency, low noise and low cost. The arrangement of the door body of the recycling bin and the inner container door improves the storage space, and the high-efficiency hydraulic device achieves the compact compression of the recyclables and meanwhile ensures the function of the bottom weighing part, realizing both compression and weighing. The inside packing and lifting devices facilitate the cleaning and transportation of the packed recyclables. The recycling bin is a practical intelligent recycling bin.

In the description of the specification, reference to terms such as "one embodiment", "some embodiments", "example", "specific example", or "some examples" means that the specific features, structures, materials, or features described in combination with the embodiment or example are included in at least one embodiment or example of the present disclosure. In the description, indicative expressions of the above terms do not necessarily refer to the same embodiments or examples. Moreover, the specific features, structures, materials or features described may be combined in an appropriate manner in any one or more embodiments or examples.

Although the above has shown and described the embodiments of the present disclosure, it is understandable that the above embodiments are exemplary and cannot not be viewed as restrictions to the present disclosure. The ordinary skill in the art can perform modifications, changes, substitutions and transformations on the above embodiments within the scope of the present disclosure without departing from the principle and spirit of the present disclosure.

What is claimed is:

1. A recycling bin for classification and compression of renewable resources, comprising a recycling bin housing, and a recycling bin inner container and a pressurizing device provided inside the recycling bin housing, wherein a weighing device is further provided between a bottom of the recycling bin inner container and the recycling bin housing; the pressurizing device comprises a compression beam provided in an upper part of an inner cavity of the recycling bin inner container, and a driving part for driving the compression beam to move; an upper end of the driving part is connected to the compression beam, and a lower end is connected to the bottom of the recycling bin inner container, wherein a packing mechanism is further provided inside of the recycling bin inner container, the packing mechanism comprises a packing strap storage tray, the packing strap storage tray is provided on a rear side wall of the recycling bin inner container, the rear side wall of the recycling bin inner container extends downward to a bottom plate of the recycling bin inner container, and a packing strap placement slot is provided extending from an inside of the bottom plate to an outside of the bottom plate.

2. The recycling bin for classification and compression of renewable resources according to claim 1, wherein the driving part is provided outside of the inner cavity of the recycling bin inner container, a strip-shape through hole is provided on a side wall of the recycling bin inner container, the compression beam extends out of the strip-shape through hole to connect to the driving part.

3. The recycling bin for classification and compression of renewable resources according to claim 1, wherein a protection bar is further provided outside of the driving part.

4. The recycling bin for classification and compression of renewable resources according to claim 1, wherein the compression beam comprises a support structure and a plurality of pressurizing bars connected to a lower side of the support structure.

5. The recycling bin for classification and compression of renewable resources according to claim 1, wherein a bin capacity detection device is further fixedly provided in a middle of a top of the recycling bin inner container.

6. The recycling bin for classification and compression of renewable resources according to claim 1, wherein the packing strap placement slot is provided with a plurality of limit bars, preventing a packing strap slipping from inside the packing strap placement slot.

7. The recycling bin for classification and compression of renewable resources according to claim 1, wherein a housing body of a recycling bin is further provided with a feeding door assembly, the housing body is provided with a feeding port, the feeding door assembly is provided on the feeding port and is used for controlling the opening and closing of the feeding port; the housing body at an edge of the feeding port is further provided with a safety light curtain which is used for detecting whether there is an obstacle inside the feeding port, the safety light curtain generates a signal to abort the closing action of the feeding door assembly when detecting an obstacle; the feeding door assembly comprises a feeding door, a driving motor and a driving rope connected to the feeding door and the driving motor, the driving rope is connected to the feeding door, the driving rope is retracted or released through the forward or reverse rotation of the driving motor to drive the up and down movement of the feeding door and thus to realize the opening and closing of the feeding port.

8. The recycling bin for classification and compression of renewable resources according to claim 7, wherein a bin body at a lower part of the feeding port is vertically provided with a slide rail, the feeding door is provided with a slide block, the slide block is connected onto the slide rail in a sliding manner, a bottom end of the slide rail is provided with a guide wheel, the driving rope is connected onto the slide block and is connected to the driving motor by passing round the guide wheel to form a ring shape, the driving motor retracts and releases the driving rope through forward rotation or reverse rotation to drive the slide block connected onto the ring shaped driving rope to slide up and down along the slide rail, thereby realizing the opening and closing of the feeding door.

9. The recycling bin for classification and compression of renewable resources according to claim 8, wherein two sides of the feeding door are provided with a lifting auxiliary guide rail for sliding positioning, the lifting auxiliary guide rail is parallel to the slide rail, the feeding door is transversely provided with an auxiliary guide rail connection plate, the feeding door is connected to the lifting auxiliary guide rail through the auxiliary guide rail connection plate, and the feeding door can move up and down along the lifting auxiliary guide rail.

10. The recycling bin for classification and compression of renewable resources according to claim 7, wherein an upper end of the feeding door is provided with a guide part, and the guide part, when contacting an obstacle, can partially decompose a reacting force of the obstacle to a moveable door body into a horizontal force.

11. The recycling bin for classification and compression of renewable resources according to claim 10, wherein the guide part is hinged to the upper end of the feeding door through an elastic hinge, the guide part turns inward when suffering an external force, and the guide part is reset through the elastic hinge after the external force disappears.

12. The recycling bin for classification and compression of renewable resources according to claim 10, wherein the upper end of the feeding door when closed is provided with a high-position travel switch, so that the feeding door stops moving upward when reaching the closed position; a lower end of the feeding door when opened is provided with a low-position travel switch, so that the feeding door stops moving downward when reaching a maximum-opening position.

13. The recycling bin for classification and compression of renewable resources according to claim 7, wherein the housing body comprises a door body and a frame body, one side of the door body is hinged to the frame body and the other side can be locked with the frame body, the feeding port is provided on an upper part of the door body, and the feeding door assembly is provided on the door body.

14. The recycling bin for classification and compression of renewable resources according to claim 13, wherein one side of the recycling bin inner container is provided with an opening, and the position of the opening corresponds to the position of the feeding port.

15. The recycling bin for classification and compression of renewable resources according to claim 14, wherein the recycling bin inner container comprises an inner container frame and an inner container door, one side of the inner container door is hinged to the inner container frame and the other side can be locked with the inner container frame, and the opening is provided on the inner container door.

* * * * *